United States Patent
Hasselbach et al.

(10) Patent No.: US 8,699,149 B2
(45) Date of Patent: Apr. 15, 2014

(54) REVERSING SYSTEM FOR A SIGHTING TELESCOPE

(75) Inventors: Dieter Hasselbach, Biebertal (DE); Klaus Becker, Gladenbach (DE); Ulrich Böde, Hohenahr (DE)

(73) Assignee: Schimdt & Bender GmbH & Co. KG, Biebertal (DE)

( * ) Notice: Subject to any disclaimer, the term of this patent is extended or adjusted under 35 U.S.C. 154(b) by 116 days.

(21) Appl. No.: 13/357,678

(22) Filed: Jan. 25, 2012

(65) Prior Publication Data

US 2012/0198749 A1    Aug. 9, 2012

(30) Foreign Application Priority Data

Jan. 28, 2011  (DE) .................... 10 2011 000 404

(51) Int. Cl.
*G02B 15/14*    (2006.01)
*G02B 7/02*    (2006.01)
*G02B 23/00*    (2006.01)

(52) U.S. Cl.
USPC ............................ 359/700; 359/819; 359/399

(58) Field of Classification Search
USPC .................................. 359/694–704, 399, 422
See application file for complete search history.

(56) References Cited

U.S. PATENT DOCUMENTS

| 4,789,231 | A | 12/1988 | Shimizu |
| 5,453,875 | A * | 9/1995 | Kolsch et al. ................. 359/399 |
| 6,449,108 | B1 | 9/2002 | Bell |
| 6,995,905 | B2 * | 2/2006 | Wagner ........................ 359/399 |
| 7,684,114 | B2 | 3/2010 | Thomas |
| 2006/0123686 | A1 * | 6/2006 | Larue ............................ 42/127 |

FOREIGN PATENT DOCUMENTS

DE    20 2006 000 977    6/2006

* cited by examiner

*Primary Examiner* — Mohammed Hasan
(74) *Attorney, Agent, or Firm* — Clark & Brody (57) ABSTRACT

Regarding a sighting telescope reversing system which comprises a guide casing fitted with a linear cam slot, further an external casing fitted with an external cam slot and fixed in the axial direction while rotatably supported on the guide casing, a mount holding a lens element and fitted with a guide pin passing through the linear cam slot as well as through the external cam slot, the present invention stipulates that the guide pin be fitted with a first and a second collar, both collars resting on a common shaft, the first collar being displaceable within the external cam slot and the second collar being displaceable within the linear cam slot.

17 Claims, 5 Drawing Sheets

REVERSING SYSTEM FOR A SIGHTING TELESCOPE

FIELD OF THE INVENTION

The present invention relates to a sighting telescope's reversal system.

BACKGROUND ART

Sighting telescopes are used in hunting and for military purposes to aim weapons at distant targets. For that purpose they are fitted with a set of lens elements configured within a housing and magnifying a target. As a result, the field of view is substantially limited and aiming at relatively nearby targets is degraded. In order that such nearby targets also may be aimed at, the state of the art offers variable magnification, i.e. zoom lenses. Also the sighted target is laterally inverted as well as upside down and therefore requires corresponding correction.

A reversing system configured within the sighting telescope is used to implement such a correction. It allows axially displacing at least one lens element within the reversing system, and as a rule further allows independent/defined displacement of two optical lens elements. Such lens elements include reticles and elements cemented to each other. This a design erects the image which is reproduced in the observed ocular plane. Present days sighting telescopes configure the reticle in the plane of the overall lens (objective) or in the ocular plane, the reversing system being configured within an inner tube of the sighting telescope.

Such a reversing system in general is made up of a guide casing fitted with a linear cam slot and of an external casing fitted with a first external cam slot and optionally with a second external cam slot, the external casing resting rotatably on the inner guide casing while being axially fixed in position. Said linear cam slot is constituted by a single straight slot running parallel to the guide casing's center axis. On the other hand the two external cam slots subtend a curved path. Moreover a first and a second mount holding two lens elements are supported in displaceable manner in said guide casing. A first guide pin is connected to the first mount and is configured at least partly within the linear cam slot and the first external cam slot. In equivalent manner, a second guide pin is linked to the second mount and configured at east in part within the linear cam slot and the second external cam slot. As a result the spacings between the lens elements of the optical reversing system and the objective plane of the sighting telescope are variable. As a result, optical magnification may be adjusted and the image no longer is upside down.

It is critical that the lens elements be configured in their design positions very accurately in order to create a sharp image for the marksman. Already positional deviations as small as 0.01 mm degrade image quality and entail parallax errors. In other words, the target mark and the actual projectile impact point deviate from each other. Accordingly all movable parts must be designed with very narrow tolerances and there must not be, so to speak, any play between them. Excess dimensions frequently are resorted to in order to preclude play. As a result the reversing system presents difficulties in adjusting it. The contact zone between the guide pins and cam slots is especially critical.

Illustratively metal screws are used in the state of the art to engage the guide pins into the cam slots. The external casing fitted with the curved cam slots also is metallic. A certain intrinsic play is present in such a combination of metal screws and metallic external casing, and as a result of this play, the metal screw may be moved within the curved cam slot. However such an intrinsic play is disadvantageous in that the reversing lens elements are not arrayed in a defined manner and therefore may cause parallax deviation. If said intrinsic play is minimized, weather-determined thermal fluctuations entail jamming on account of the parts' thermal expansion. This condition not only prevents instantaneous adjustability, but also causes permanent damage when forcefully acted on by the marksman. Such problems are encountered at very low temperatures, for instance as low as −40° C. (−40° F.).

In a further design of the state of the art, the guide pin and the external casing both are metallic, however the guide pin is partly fitted with a plastic cladding. The diameter of the guide pin in said cladded zone evinces a diameter larger than the width of the cam slots. By means of its oversized cladding, the guide pin enters the linear cam slot and the external cam slot. As a result, in the first place, the play causing the parallaxes is precluded. On the other hand it has been observed that such a reversing system also will jam at very low temperatures.

Furthermore the German patent document DE 20 2006 000 977 U1 discloses a guide pin, in particular a guide screw, comprising a first cladding element and a second cladding element to enclose the screw. The first cladding element is configured on the screw and the second cladding element is configured on the first cladding element. Also the second cladding element is oversized relative to the cam slot, but not the first one. Accordingly installing the second cladding element will warp it. In further plastic deformation of the second cladding element caused by firing the weapon the warping caused by the first cladding element is limited. For that purpose the first cladding element is fitted with a shoulder which, following exceeding a given plastic deformation of the second cladding element, will brace the guide pin against at least one of the cam slots. Consequently the first cladding element will touch the second one only when latter is highly stressed.

This design however also incurs a drawback, namely that a reversing system fitted with such a guide peg shall jam at very low temperatures, in particular because then the plastic becomes brittle and inelastic. As a result, due to oversizing and the different thetinal coefficients of expansion of the materials used and hence of the parts, the second cladding element may break.

SUMMARY OF THE INVENTION

Accordingly it is the purpose of the present invention to create a reversing system that may operate within a very wide temperature spectrum and in particular also at very low temperatures while remaining free of damage/destruction and being ergonometric, without degrading image quality or parallax quality. The design of the invention shall allow simple manufacture, installation, and be economical, while also offering long service life. Preferably as well, the design of the invention also shall allow retrofitting sighting telescopes.

As regards a sighting telescope reversing system—comprising a guide casing containing a linear cam slot, an external casing fitted with a external cam slot which rest rotatably on said guide casing and which is fixed in position axially, a mount holding a lens element in the guide casing, the guide casing further comprising a guide pin passing through the linear cam slot and the external cam slot and being supported in axially displaceable manner—the present invention stipulates that the guide pin comprise a first and a second collar, both collars being supported on a common shaft, the first collar being displaceable within the external cam slot and the second collar within the linear cam slot.

Forces/stresses transmitted from the linear cam slot to the guide pin therefore run at least partly through the second collar. Similarly forces/stresses transmitted from the external cam slot to the guide pin run at least partly through the first collar. Depending on the position of the guide pin in the linear and external cam slots, different forces/stresses act on the first and second collars. Shear strains and shear peaks due to opposite forces acting on the first and second collars do not add in the design of the present invention. Plastic deformations and ruptures are precluded also both at very high and very low temperatures.

Also, the reversing system of the present invention is unusually economical and easy to assemble/install. The required sleeves and shafts remanufactured easily and such a guide pin not only to may be installed in a new reversing system but also may be retrofitted in earlier reversing systems.

The optical elements employed include lens elements, cemented lens elements and reticles.

Preferably the two collars are axially offset from each other rest adjacently on the shaft. This feature makes guide pin installation very simple. In particular the first collar shall be slipped first onto the shaft and then the second sleeve shall be, and the shaft then shall be connected to the mount.

As a rule the external slot shall be a cam slot track. Usually this track is spiral, without a constant pitch. Accordingly the advance of the mount holding the lens element is not constant per unit rotation. In this manner the curved cam slot allows matching the adjustments to the lens element's optical effects depending on position. A shallow gradient may be used for detectable positions and a larger gradient for less detectable ones. However excessive gradients should be avoided because such might cause self-locking of the reversing system. With this design, the marksman may ergonometrically use the range of adjustment and continuously rotate an appropriate adjustment wheel while the magnification is changed at different rates resp. impulsively.

In one embodiment mode of the invention, the mount is fitted with a rib matching the linear cam slot, as a result of which the mount is supported in tilt-resistant and irrotational manner relative to the guide casing. This feature furthermore keeps the mount fixed in position and in improved alignment, reducing friction. Also, installation is much simplified because the mount cannot rotate in the guide casing until the guide pin is connected to it. To allow at all inserting such a rib-fitted mount into the guide casing, the linear cam slot may extend as far as said guide casing and be unilaterally open, or, preferably, it may continue in the form of a groove on the inside of this guide casing.

The invention is especially advantageous when the first collar and/or the second collar are rotatable. Different forces act on the collars depending of the guide pin's position in the cam slots. Collar adhesion to the contacted cam slot is largest in the region where the largest force is introduced from the cam slot into the collar. When the external casing is rotated toward the guide casing, this collar then can roll across this region whereas, in less loaded regions, in particular of the opposite side, it slips over the cam slot. Very advantageously too, the first and the second collars are able to rotate at different speeds and in different directions. As a result, the shear forces acting on the collars are minimized and damage to material is effectively avoided. Moreover the forces required for adjustments are slight and the reversing system will not jam even at very low temperatures.

A parting line perpendicular to the shaft is especially preferred to minimize as much as possible the friction between the two collars. Friction can be reduced further by reducing the contact area between the two collars, respectively in that at least one of the collars, on the sides of the contact area with the other collar, is centrally somewhat longer than at the external radius, or vice-versa. Illustratively a bevel is also appropriate.

Moreover the first collar may be designed to at least partly pass through the said linear cam slot. This feature may be implemented in at least two shapes. In one of theses shapes the first collar also makes contact with the linear cam slot, in a manner of speaking it is split with the second collar. This feature substantially reduces the strain transition, especially due to shear strains, on the shaft, and also tilting at the transitions is avoided, with consequent reduction of friction. Jointly with an appropriate material selection of the first and second collars, such a design may offer improved operation at low temperatures. Illustratively one collar made of an especially slippery material may be combined with another made of an especially firm material. In the other shape the first collar enters the second one, whereby the latter might be supported at least partly on the former. For instance an especially firm first collar might support a weaker second collar.

Just as well, the second collar will at least partly penetrate the external cam slot.

Illustratively, in one embodiment variation, the first and second collars are of the same diameter. This feature implies that the linear cam slot and the external cam slot are the same width. However this does not imply manufacturing tolerances or different oversizes of the two collars, but instead a clear dimensional deviation. An interacting design also is feasible, where the first collar and the external cam slot are matched to each other and the linear cam slot is matched to the second collar, illustratively the diameter of the first collar being twice that of the second collar.

In especially appropriate manner, the first and second collars are made of different materials, one of them illustratively being made of brass and the other of plastic. Illustratively again, one collar may be made of an especially slippery material and be combined with a collar made of an especially tight material. Brass in particular offers self-lubricating properties supporting long-lasting displacement. Another collar adjacent to the one of brass and resting against latter may profit from said self-lubrication. Said adjacent collar might be made of a plastic offering positively elastic properties and allowing making the collar over-sized to preclude any play. In especially preferred manner, the second collar is made of brass and the first collar of a plastic.

Preferably the shaft comprises a stop segment, a support segment to support the first and second collars, and an affixing segment for affixation to the mount. In particular the stop segment's diameter is larger than the inside diameter of the collars. The first collar may be fitted with inwardly pointing peripheral edge as a result of which the stop segment is configured within the first guide casing. Consequently overhang by the stop segment relative to the external casing will be minimal and the reversing system requires only minimal space. As a result the sighting telescope size is reduced and thereby more light-weight and easier to handle.

Preferably the affixing segment is the thread to allow screwing the guide pin into the mount. This feature allows simple and rapid assembly/installation. However affixation also may be implemented by force-fitting, riveting or similar.

The present invention offers a very considerable improvement over the state of the art by configuring a second external cam slot into the external casing and by configuring in axially displaceable manner a second mount comprising a second lens element in the guide casing and with a second guide pin penetrating the linear cam slot and the second external cam slot, said second guide pin comprising a third and a fourth collar, both of these collars resting on a common second shaft, the third collar being displaceable within the second external cam slot and the fourth collar within the linear cam slot.

This second external cam slot in this design also may be a curved track. The required drive forces in such a configuration are approximately double of what they are for a single displaceable lens element. Accordingly special significance attaches to reduce said drive forces to preclude jamming or self-locking and is attained in the present invention by the guide pins with the first, second, third and fourth collars. Also, a reversing system with two displaceable lens elements will be longer and comprises longer cam slots. As a result, thermal warping of the reversing system takes place when incurring changes in temperature that in the state of the art cause jamming at very low temperatures. This susceptibility to defects is considerably reduced in the design of the invention by the improved slide guidance of the guide pins.

Additionally, the second mount may be fitted with a rib matching the linear cam slot so that this second mount is supported irrotationally and in tilt-resistant manner relative to the guide casing. Preferably the third and/or the fourth collars also are displaceable, whereby, as discussed above, both guidance and service life are improved.

Optional embodiment modes stipulate that the third collar at least partly penetrate the linear cam slot and/or the fourth collar at least partly penetrate the second external cam slot and/or that the third and fourth collars are of the same diameter.

The third and fourth collars may be made of different materials, one being preferably made of brass and the other of plastic. In especially preferred manner, the fourth collar is made of brass and the third collar of plastic.

Equivalently, as regards the first shaft, the second shaft also may consist of a second stop segment, a second support segment on which rest the third and fourth collars, and of a second affixation segment for fastening to the second mount.

The advantages offered by the geometry of the second guide pin basically are the same as those offered by the first guide pin, however they bear especially on a design of two displaceable mounts holding lens elements because in such a design the adjustment forces are larger, friction is greater, and to high positional accuracy of two displaceable lens elements must be assured. The number of parts is advantageously reduced so that the first and second guide pins be structurally identical. This feature keeps costs low and simplifies assembly.

BRIEF DESCRIPTION OF THE DRAWINGS

Further features, particulars and advantages of the present invention are defined in the claims and discussed of the illustrative embodiment description below and follow from the appended drawings.

DETAILED DESCRIPTION OF THE INVENTION

Figure 1:
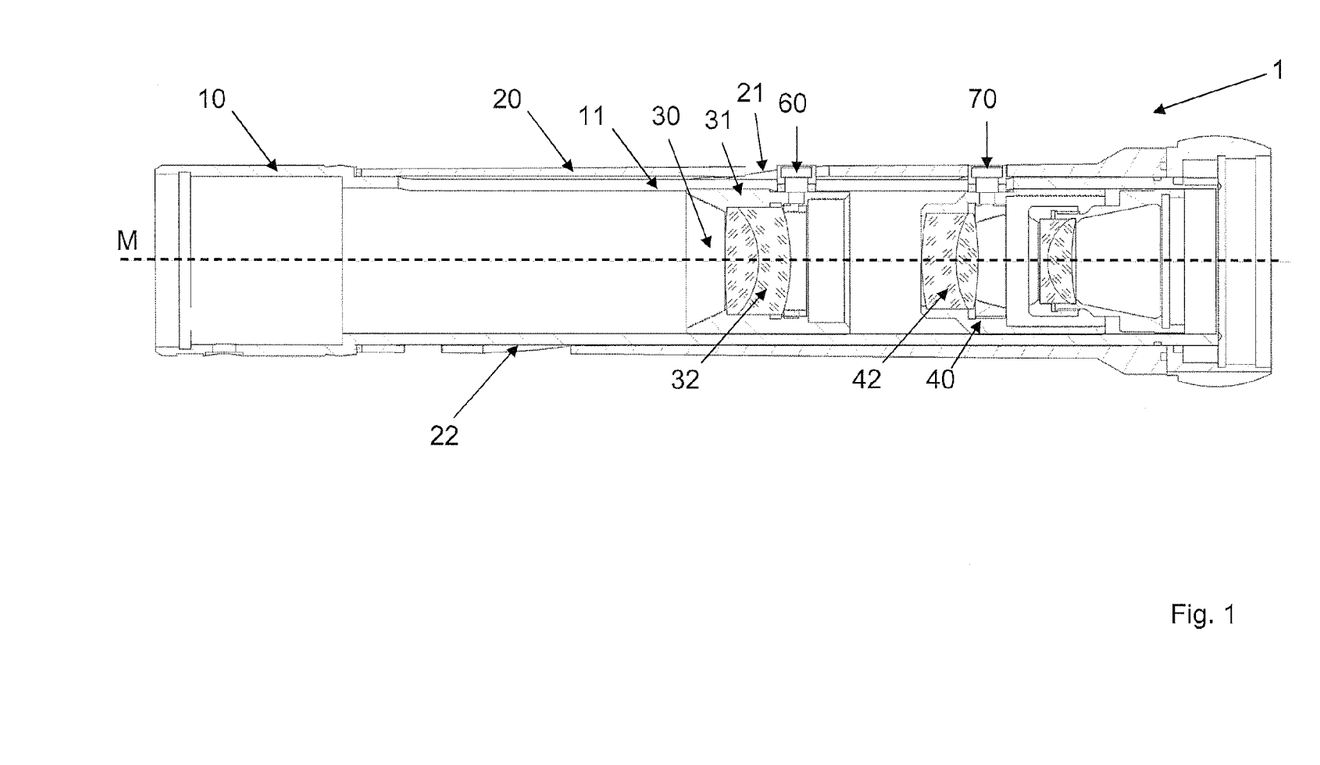
FIG. 1 shows a lengthwise section of a reversing system of the invention.

FIG. 1 is a lengthwise section of a sighting telescope's linear cam slot reversing system comprising a guide casing 10 fitted with a linear cam slot 11. An external casing 20 fitted with an external cam slot 21 and with a second external cam slot 22 rests rotatably on the guide casing 10 while being fixed in position axially. A mount 30—holding a lens element 32 and fitted with a guide pin 60 penetrating the linear cam slot 11 and the external cam slot 21—rests in axially displaceable manner in the guide casing 10. Said guide casing 10 moreover contains a second mount 40 which is axially displaceable therein and which holds a second lens element 42 and a second guide pin 70 penetrating the linear cam slot 11 and the second external cam slot 22.

By affixing in place the guide casing 10 and rotating the external casing 20 about the center axis M, the first and second guide pins (60, 70) are displaced in defined manner by the linear cam slot 11, the external cam slot 21 and the second external cam slot 22, as a result of which the lens element 32 and the second lens element 42 are displaced linearly within the reversing system 1 along the direction of the center axis M.

Figure 2:
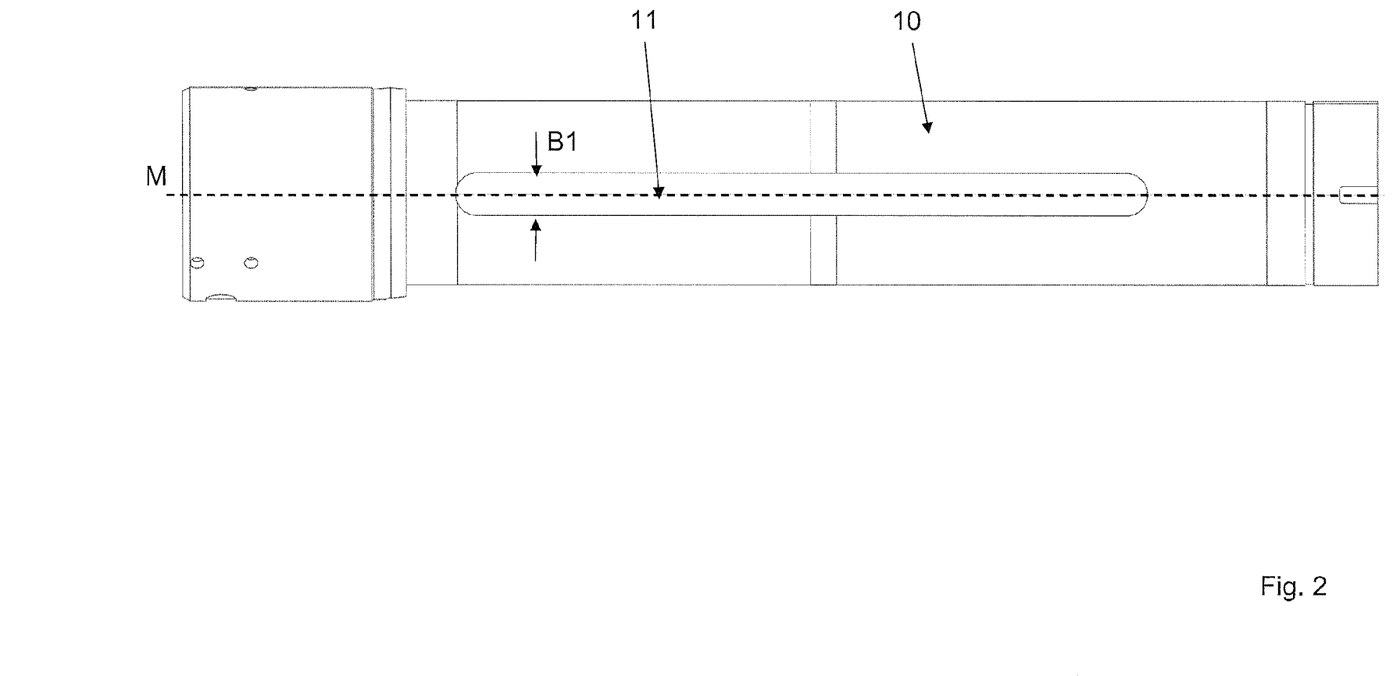
FIG. 2 shows a guide casing.
Figure 3:
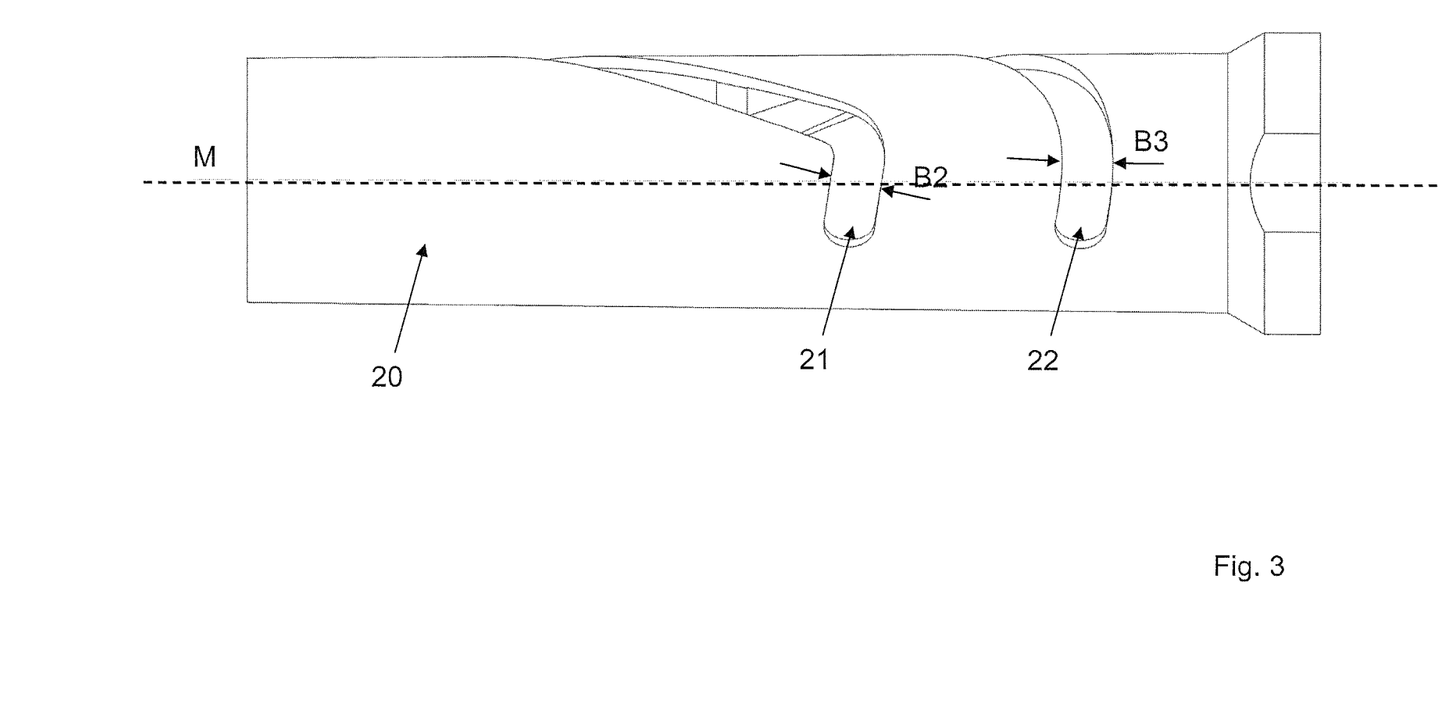
FIG. 3 shows an external casing.

FIG. 2 is a detailed view of a guide casing 10 fitted with a linear cam slot 11. The linear cam slot 11 runs parallel to the center axis M of the guide casing 10 and its width is denoted by B1. A matching external casing 20 is shown in detail in FIG. 3. This external casing 20 is fitted with two external cam slots 21, 22 designed as curved tracks which nowhere run parallel to the center axis M of the external casing 20. The width of the external cam slot 21 is B2 and that of the second external cam slot 22 is B3.

Figure 4:
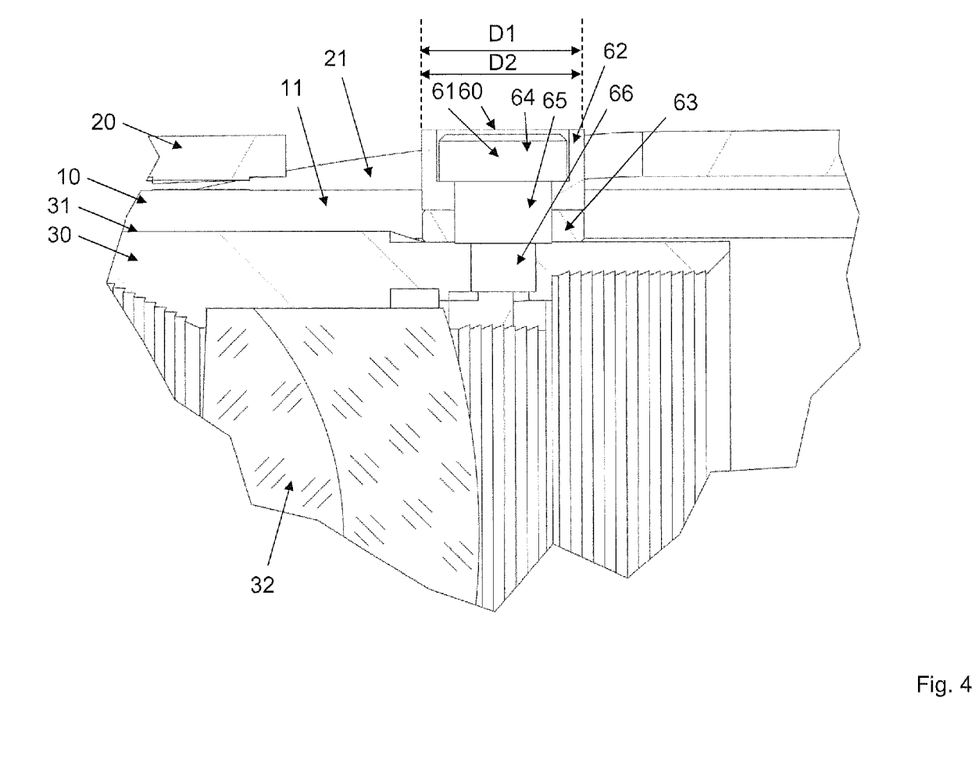
FIG. 4 is a detailed view of a longitudinal section of a guide pin configured in a reversing system and FIG. 5 is a cutaway of a longitudinal section of a reversing system comprising two displaceable lens elements.

FIG. 4 is a detail view of a lengthwise section of a guide pin 60 which is configured in a reversing system. The guide pin 60 is connected to a mount 30 holding a lens element 32 and is fitted with a rib 31. The guide pin 60 passes through a guide casing 10 comprising a linear guide 11 and through an external casing 20 fitted with an external cam slot 21. The rib 31 also matches the linear cam slot 10.

As shown in detail, the guide pin 60 comprises a first collar 62 and a second collar 63, both collars 62, 63 resting on a common shaft 61. This shaft consists of three segments, in particular of a stop segment 64, a support segment 65 supporting the first and second collars 62, 63, and an affixation segment 66 for affixation to the mount 30. In particular, each segment is in the form of a cylindrical offset.

The first collar 62 and the second collar 63 exhibit the same diameter D1, D2. Moreover the first collar 62 is fitted with inwardly pointing, lower edge in order that the stop segment 64 positioned within the first collar 62 project only very little beyond the external collar 20. In this design the stop segment 64 also may act as a support of the first collar 62. However FIG. 4 shows a design where the support is wholly provided by the support segment 65.

FIG. 4 also shows that the first collar 62 also partly penetrates the linear casing 11.

Accordingly the collar 62 is guided by the linear casing 11 and the external casing 21, the rest area facing the external casing 21 however being substantially larger. On the other hand the second collar 63 is solely guided by the linear casing 11. Also, the two collars 62, 63 subtend a boundary line which runs horizontally, that is perpendicularly to the shaft 61. In this design already the contact area between the two collars 62, 63 is minor. To further reduce the contact area and hence the friction between the two collars 63, 63 and the mount 10, said second collar 62 is fitted with a bevel at each of its sides.

Figure 5:
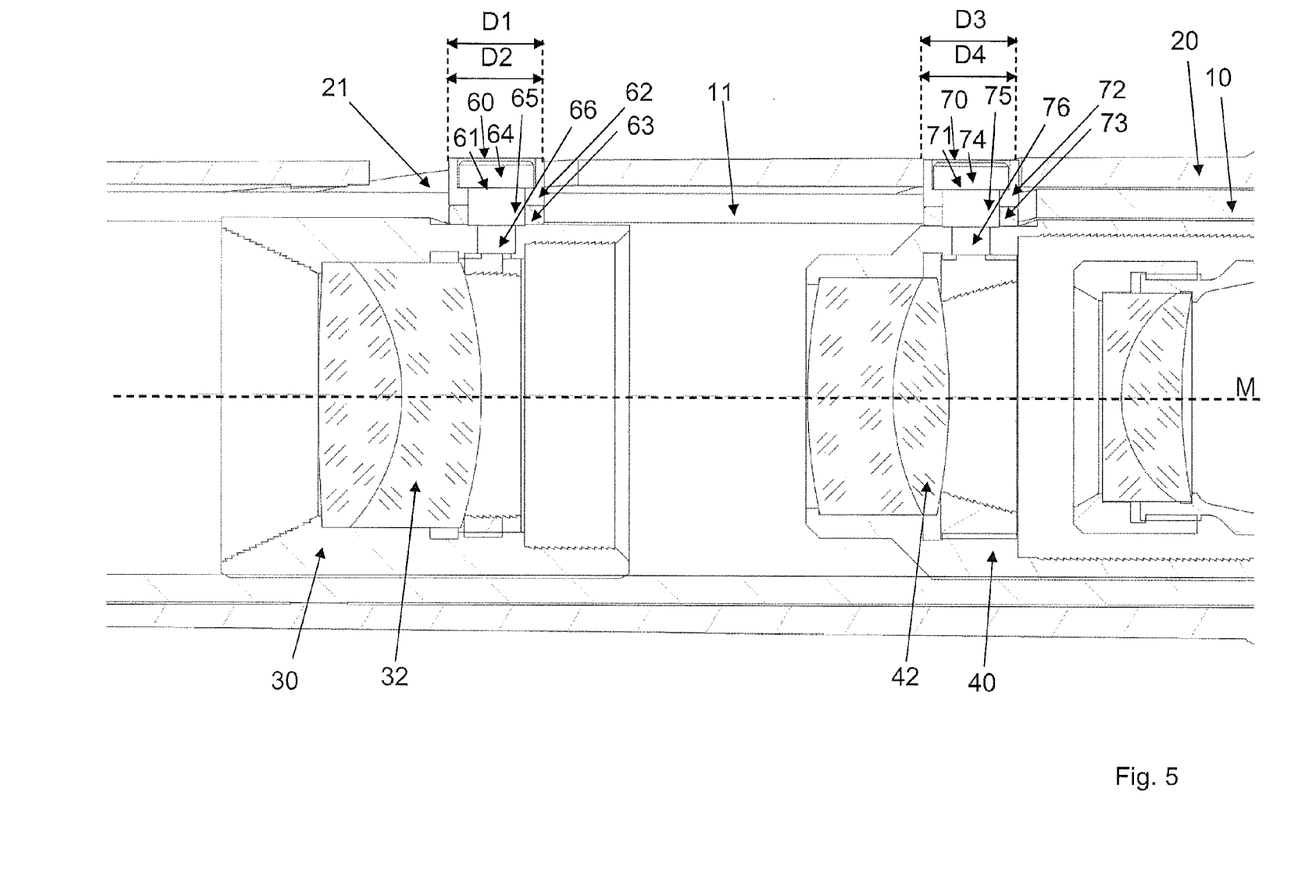

Lastly, FIG. 5 shows a cutaway of a longitudinal section of a reversing system fitted with two displaceable lens elements 32, 42. The reversing system comprises a guide casing 10 within which is configured a linear cam slot element 11. An external casing 20, fitted with an external cam slot 21 and (not visible) a second external cam slot, is rotatably supported on the guide casing 10 while being fixed in its axial position. A mount 30—holding a lens element 32 and fitted with a guide pin 60 passing through the linear cam slot element 11 and the external cam slot element 21—rests in the guide casing 10. Moreover a second mount 40 holding a second lens element 42 and a second guide pin 70 passing through the linear cam slot 11 and the second external cam slot 21 is supported in axially displaceable in the guide casing 10.

The first and second guide pins 60, 70 are displaced controllably by the linear cam slot element 11, the external cam slot element 21 and the second external cam slot when the guide casing 11 is stopped in place and the external casing 20 is rotated about the center axis M, as result of which the lens element 32 and the second lens element 42 are linearly displaced within the reversing system 1 along the center axis M.

The details show that the guide pin 60 is fitted with a first and second collar 62, 63 of the same diameter D1, D2 and are configured about a common shaft 61. The shaft 61 consists of three segments, in particular of a stop segment 64, a support segment 65 supporting the first and second collars 62, 63, and an affixation segment 66 for affixing to the mount 30.

In similar manner, the guide pin 70 comprises a third collar 72 and a fourth collar 73, where the two collars 72, 73 rest on a common shaft 71. This shaft consists of three segments, in particular of a stop segment 74, a support segment 75 supporting the third and fourth collars 72, 73 and an affixation segment 76 for affixation to the mount 40.

The third collar 72 and the fourth collar 73 are of the same outer diameter D3, D4. Moreover the first collar 62 and the third collar 63 are fitted with a lower, inwardly directed circumferential edge as a result of which the stop segments 64, 67 are positioned respectively within the first and third collars 62, 72 and project only minimally beyond the external casing 20.

The invention is not restricted to one of the above discussed embodiment modes but on the to contrary may be modified in many ways.

All features and advantages, inclusive design particulars, spatial configurations and procedural steps, may be construed being inventive both per se as well as in arbitrary combinations.

LIST OF REFERENCES

| | |
|---|---|
| 1 | reversing system |
| 10 | guide casing |
| 11 | linear cam slot |
| 20 | external casing |
| 21 | external cam slot |
| 22 | second external cam slot |
| 30 | mount |
| 31 | rib |
| 32 | lens element |
| 40 | second mount |
| 42 | second lens element |
| 60 | guide pin |
| 61 | shaft |
| 62 | first collar |
| 63 | second collar |
| 64 | stop segment |
| 65 | support segment |
| 66 | affixation segment |
| 70 | second guide pin |
| 71 | second shaft |
| 72 | third collar |
| 73 | fourth collar |
| 74 | second stop segment |
| 75 | second support segment |

LIST OF REFERENCES

| | |
|---|---|
| 76 | second affixation segment |
| B1 | width |
| B2 | width |
| D1 | outside diameter |
| D2 | outside diameter |
| D3 | outside diameter |
| D4 | outside diameter |
| M | center axis |

The invention claimed is:

1. A sighting telescope reversing system comprising:
a guide casing having a linear cam slot formed therein and an external casing having an external cam slot formed therein, the external casing being rotatably supported on the guide casing while being axially fixed thereon in position, and
a mount which is both axially displaceable and arranged inside of the guide casing, the mount holding a lens element and comprising a guide pin running through the linear cam slot of the guide casing and through the external cam slot of the external casing,
characterized in that the guide pin comprises a first collar and a second collar, both collars resting on a common shaft and the first collar being displaceable within the external cam slot and the second collar being displaceable within the linear cam slot.

2. The reversing system as claimed in claim 1, characterized in that the external cam slot element is a curved track.

3. The reversing system as claimed in claim 1, characterized in that the mount is fitted with a rib which matches the linear cam slot, as a result of which the mount is supported irrotationally and in tilt-resistant manner relative to the guide casing.

4. The reversing system as claimed in claim 1, characterized in that one or both of the first collar and the second collar are rotatable.

5. The reversing system as claimed in claim 1, characterized in that the first collar penetrates at least partly the linear cam slot.

6. The reversing system as claimed in claim 1, characterized in that the second collar penetrates at least partly the external cam slot.

7. The reversing system as claimed in claim 1, characterized in that the first collar and the second collar are of the same diameter.

8. The reversing system as claimed in claim 1, characterized in that the first collar and the second collar are made of different materials.

9. The reversing system as claimed in claim 8, characterized in that one of the first and second collars is made of brass and the other is made of plastic.

10. The reversing system as claimed in claim 1, characterized in that the shaft consists of a stop segment, a support segment to support the first and second collars, and an affixation segment for affixation to the mount.

11. The reversing system as defined in claim 1, characterized in that a second external cam slot is configured in the external casing and in that a second mount fitted with a second lens element and with a second guide pin passing through the linear cam slot and through the second external cam slot and is supported and axially displaceable within the guide casing, the second guide pin comprising a third collar and a fourth collar, further both collars resting against a common, second shaft, the third collar being displaceable within the second external cam slot and the fourth collar being displaceable within the linear cam slot.

12. The reversing system as claimed in claim 11, characterized in that one or both of the third collar and the fourth collar are rotatable.

13. The reversing system as claimed in claim 11, characterized in that the third collar at least partly passes through the linear cam slot and/or the fourth collar at least partly passes through the second external cam slot.

14. The reversing system as claimed in claim 11, characterized in that the third collar and the fourth collar are of the same diameter.

15. The reversing system as claimed in claim 11, characterized in that the second shaft consists of a second stop segment, a second support segment supporting the third and fourth collars, and a second affixation segment for affixation to the second mount.

16. The reversing system as claimed in claim 1, characterized in that the third collar and the fourth collar are made of different materials.

17. The reversing system as claimed in claim 16, characterized in that one of the third and fourth collars is made of brass and the other is made of plastic.

\* \* \* \* \*